Patented Apr. 17, 1934

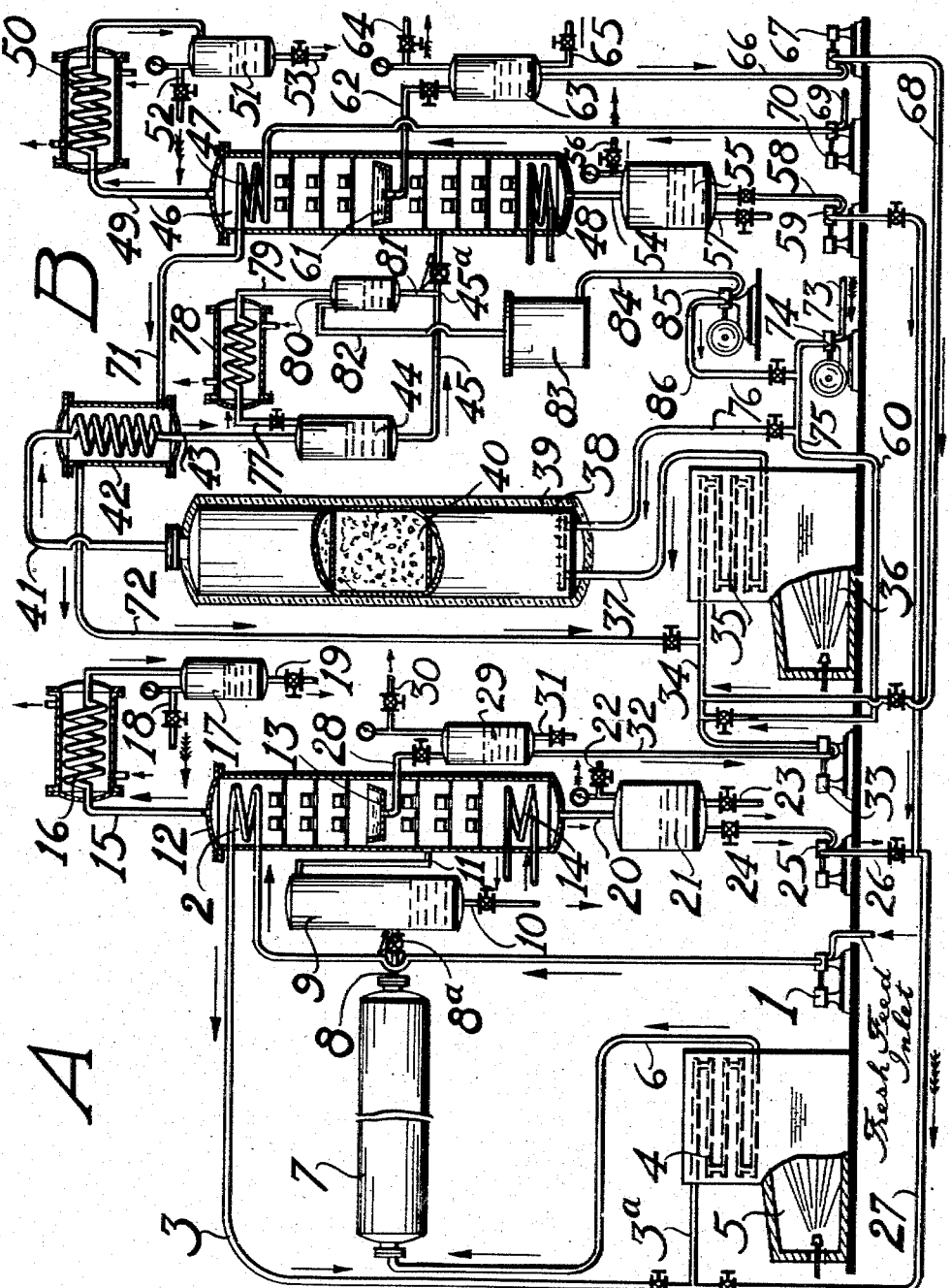

1,955,268

UNITED STATES PATENT OFFICE 1,955,268

PROCESS FOR PREPARING LOW BOILING HYDROCARBONS FROM HIGHER BOILING HYDROCARBONS

Philip L. Young and Durand Churchill, Jr., New York, N. Y., assignors to Standard-I. G. Co.

Application December 11, 1930, Serial No. 501,548

5 Claims. (Cl. 196—53)

This invention relates to the production of lower boiling hydrocarbons from higher boiling hydrocarbons and more specifically comprises a combination of cracking and hydrocycliformation in which the heaviest fraction of the product from each stage is continuously returned to the cracking step.

Our process will be fully understood from the following description and the drawing which is a semi-diagrammatic view in sectional elevation of a suitable type of apparatus for accomplishing our process and indicates the flow of the various materials.

In the drawing the letter A designates a cracking unit and the letter B a hydrocycliformation unit. Reference character 1 designates a feed pump which draws fresh oil from any suitable source (not shown) and forces it through coil 2 and lines 3 and 3a into heating coil 4 mounted in a suitable furnace setting 5 which may be fired by gas or other suitable means. The hot oil flows through line 6 into cracking chamber 7 from which cracked products leave through line 8, flow past pressure reduction valve 8a and discharge into drum 9 wherein tar settles out and may be drawn off through line 10. The remaining cracked products in vapor form flow through line 11 into fractionating tower 12 equipped with cooling coil 2, pan 13 and heating coil 14.

Uncondensed vapors flow out of tower 12 through line 15 into cooler 16 and discharge thence into drum 17 fitted with gas release line 18 and liquid draw-off line 19. The heaviest fraction of the condensate collects at the bottom of the tower 12 and is drawn off through line 20 and discharged into drum 21 fitted with gas release line 22 and liquid draw-off line 23. This fraction may be drawn through line 24 by pump 25 and forced through lines 26, 27 and 3a into heating coil 4 and thence returned to cracking chamber 7.

The lighter fractions of the condensate in tower 12 collect on pan 13 and flow through line 28 into drum 29 fitted with gas release line 30 and liquid draw-off line 31. This fraction may be withdrawn from drum 29 through line 32 by pump 33 and forced through line 34 to the hydrocycliformation unit B.

The cracked products from drum 29 flow through line 34 into heating coil 35 mounted in suitable furnace setting 36 fired by gas or other means and the hot oil flows thence through line 37 and discharges through a suitable series of openings into high pressure reactor 38, which is adapted to withstand high temperatures and pressures and is also resistant to attack by hydrogen and the reacting materials. Reactor 38 may also be covered with a suitable insulating material 39 and preferably contains a catalytic material 40 the nature of which will be described below. Hot products leave the reactor through line 41, flow through heat exchanger 42 wherein they are partially cooled by interchange of heat with fresh feed oil, and discharge through line 43 into separating drum 44 from which liquid products flow through line 45 past pressure reduction valve 45a, and enter fractionating tower 46, which is equipped with cooling coil 47 and heating coil 48.

Uncondensed vapors leave tower 46 through line 49 pass through cooler 50 and the condensate is collected in drum 51 equipped with gas release line 52 and liquid draw-off line 53 through which the product may be withdrawn and sent to storage or to equipment (not shown) for further treatment. The heavier fraction of the condensate in tower 46 may be withdrawn through line 54 and collected in drum 55 fitted with gas release line 56 and liquid draw-off line 57. This fraction may be drawn through line 58 by pump 59 and returned through lines 60, 27, 3a, coil 4 and line 6 to cracking chamber 7. Lighter fractions of the condensate in tower 46 collect on pan 61 from which they flow through line 62 into drum 63 fitted with gas release line 64 and liquid draw-off line 65, from which they may be withdrawn through line 66 by pump 67 and forced through line 68 to line 34 and thence returned through coil 35 to reactor 38.

Fresh hydrocarbon oil of substantially the same boiling range and characteristics as the intermediate fraction of the cracked product sent to the hydrocycliformation unit may be drawn from suitable storage (not shown) through line 69 and forced by pump 70 through coil 47, line 71 and heat exchanger 42 and passed thence through line 72 which meets line 34 carrying hot intermediate cracked product and thus passed through coil 35 into reactor 38.

Hydrogen or a gas rich in free hydrogen is drawn from a suitable holder (not shown) through line 73 into compressor 74 in which it is compressed to a high pressure, substantially that maintained in reactor 38, and is forced through line 75 which meets oil line 34, so that the oil may be mixed with hydrogen before passing through the coil. Hydrogen may also be admitted directly to the reactor through line 76.

The uncondensed gases in the separating drum 44 contain a substantial quantity of free hydrogen which may be advantageously recirculated to the reactor. These gases leave separating drum 44 through line 77, and may pass first through a cooler 78 in which light hydrocarbons may be condensed. The light condensate and remaining gases pass through line 79 into separating drum 80, from which the liquid flows through line 81 to line 45, and the gas flows through line 82 into purification system 83 in which hydrogen sulfide, ammonia and other impurities as well as uncondensed hydrocarbons are removed, for example by scrubbing with oil, alkali or water or any combinations of these, and the purified gas flows thence through line 84 to booster compressor 85 which recompresses it to reactor pressure and returns it through line 86 to fresh hydrogen line 75.

Catalytic materials that may be used in reactor 38 comprise the oxides or sulfides of metals of the II, IV and VI groups of the periodic system or mixtures of these. The catalytic material may be in the form of lumps of convenient shape and size which may be supported on trays or by other means in the reactor. The oxides or sulfides of molybdenum, chromium and tungsten preferably in combination with the oxides of zinc or magnesium may be mentioned as suitable catalytic materials and all of these are characterized by immunity to sulfur poisoning.

In the operation of my process any high boiling hydrocarbon oil may be used as fresh feed stock to the cracking unit A for example, heavy naphthas, gas oils, reduced crudes and other heavy fractions. The fresh feed is heated in coil 4 to a temperature above about 750° F. and preferably between about 800 and 900° F. Cracking chamber 7 may be maintained at temperatures above about 725° F. and under normal or superatmospheric pressure. In the latter case, the pressure is preferably in excess of 500 pounds per square inch. Pressures of 750 or 1000 pounds per square inch or higher and temperatures of 800° F. to 900° F. are especially satisfactory. It will be understood, however, that cracking unit A may be of any preferred type and that the conditions of operation may be varied within wide limits. When operating under superatmospheric pressure the reduction in pressure on the cracked products at valve 8a will generally cause the major quantity of the oil to vaporize when discharged into drum 9. The pressure prevailing in drum 9 may be atmospheric, but is preferably higher, say 25 to 100 pounds per square inch, or higher.

The cracked vapors from which tar has been removed are separated in tower 12 into three fractions having approximately the following characteristics:

Light distillate

| | |
|---|---|
| Gravity A. P. I. | 50° to 60° |
| Initial boiling pt. | 90 to 100° F. |
| Final boiling pt. | 350 to 450° F. |

Intermediate fraction

| | |
|---|---|
| Gravity A. P. I. | 30° to 40° |
| Initial boiling pt. | 350 to 450° F. |
| Final boiling pt. | 550 to 725° F. |

Heavy fraction

| | |
|---|---|
| Gravity A. P. I. | 20° to 30° |
| Initial boiling pt. | 550 to 725° F. |

The light distillate is especially suitable for motor fuel and may be blended with the light distillate produced in the hydrocycliformation unit B which is collected in drum 51. It may be subjected to the usual acid, clay or other finishing treatment as will be understood.

The intermediate fraction is subjected to hydrocycliformation in unit B. The term hydrocycliformation is used to define a process for the production of anti-detonating motor fuels by destructive hydrogenation of hydrocarbon oils. It leaves tower 12 at a temperature above about 400° F. and may be advantageously mixed at this point with fresh hydrocarbon oil of approximately the same boiling range and characteristics which has been preheated to about the same temperature in heat interchanger 42. The cracked oil or mixture of cracked and fresh oil may then be forced by pump 33 under pressure in excess of 20 atmospheres, preferably 100 or 200 atmospheres or higher into coil 35 in which it is heated to a temperature in excess of 850° F., preferably between about 900 and 1000° F. and thence discharged into reactor 38. The oil is preferably admixed with hydrogen before passage through the coil. Reactor 38 is maintained at temperatures between about 900 and 1100° F. principally by the heat evolved in the hydrogenation of the oil and by the heat introduced with the oil, but it will be understood that additional heat may be furnished by other means such as by electrical heaters (not shown) placed inside the reactor. The pressure in the reactor is also in excess of 20 atmospheres and preferably 100 or 200 atmospheres or higher.

The hot products which leave the reactor are only partially cooled in heat exchanger 42 so that the liquid collected in drum 44 is at a temperature substantially above 400° F. and therefore on the reduction of pressure at valve 45a to substantially atmospheric pressure it is almost completely vaporized before discharging into the fractionating tower 46. However, it will be understood that the liquid may be more completely cooled, for example, by a cooler inserted in line 45, before it is discharged into tower 46. Hydrocarbons remaining uncondensed at the temperature in drum 44 may be cooled in cooler 78 and this condensate may be combined with the liquid in drum 44. The hydrocycliformed product is likewise separated into three fractions having approximately the following characteristics:

Light distillate

| | |
|---|---|
| Gravity A. P. I. | 50° to 60° |
| Initial boiling pt. | 90 to 100° F. |
| Final boiling pt. | 350 to 450° F. |

Intermediate fraction

| | |
|---|---|
| Gravity A. P. I. | 20° to 30° |
| Initial boiling pt. | 350 to 450° F. |
| Final boiling pt. | 550° to 725° F. |

Heavy fraction

| | |
|---|---|
| Gravity | 10 to 20° |
| Initial boiling pt. | Above 550° F. |

The initial and final boiling points given here and above refer to operation with good fractionation. Where, however, fractionation is poor, it should be understood that the initial boiling point is the temperature at which about 3.5 to 7% distills over, and the final boiling point the temperature at which about 90 to 97% distills over.

The yields of each fraction obtained will depend very largely on the nature and boiling range of the oil being treated and on the conditions of treating. The yield of distillate may vary from 50 to 80% by volume on the fresh feed charged to the hydrogenation zone, and the yields of intermediate fraction and heavy fraction expressed as volume on fresh feed may vary from 10 to 20% or more and from 5 to 10% or more respectively.

The light distillate has marked anti-detonation qualities, having a knock rating equivalent to that of normal heptane containing 70% or more of iso-octane. It is also characterized by very low sulfur content, generally below about .015, and is stable in respect to color and gum formation. As mentioned above this light distillate may be advantageously blended with the light distillate obtained in the cracking step. The intermediate fraction is preferably recycled to reactor 38 for further hydrocycliformation.

The heavy fractions from both the cracking step and the hydrocycliformation step are preferably returned to the cracking operation. The tar from the cracking coil may also be returned to the cracking operation, and this is advantageous when the maximum yield of gasoline is desired and fuel oil is not wanted.

It has been found that higher boiling fractions, say those with initial boiling point above about 625° F. have a great tendency to coke in the hydrogenation zone unless partial pressures of hydrogen considerably in excess of those required for suitable hydrocycliformation of the lower boiling fractions are used. It is, therefore, desirable to return these high boiling fractions for further cracking.

The quantity of hydrogen used varies greatly with the nature of the particular oil being treated. In general 2000, 3000 or 5000 cubic feet of hydrogen per barrel of oil is sufficient, but more may be used. The ratio of partial pressure of oil to hydrogen is roughly about 1:3, when operating at 200 atmospheres total pressure. The partial pressure of oil may vary from 20 to 70 atmospheres and the partial pressure of hydrogen and other gases from about 130 to 180 atmospheres. The space velocity in the hydrogenation zone is preferably from 1.0 to 3.0 volumes of oil per volume of reaction space per hour, although higher or lower space velocities may be used.

The present process is particularly applicable to those types of oil, for example highly aromatic stocks, which upon hydrocycliformation produce considerable quantities of very high boiling and refractory compounds. By this process these refractory products can be immediately withdrawn from the hydrocycliformation unit and subjected to further cracking before resubmitting them to hydrocycliformation. The effect of this is to keep the hydrocycliformation zone practically entirely free from fractions other than those most easily hydrocycliformed and in this way to greatly prolong the active life of the catalyst and to enable efficient operation for a longer period.

This invention is not limited by any theory of the mechanism of the reactions, nor by any particular methods of cracking and hydrogenation which have been described for purposes of illustration only. The cracking may either be in liquid phase or vapor phase and may be conducted with a coil alone or with a coil and soaking drum. It will also be understood that the methods of operation of both steps may be varied within wide limits. Our invention is limited only by the following claims in which we wish to claim all novelty inherent in it.

We claim:

1. Improved process for preparing lower boiling hydrocarbons from higher boiling hydrocarbons, which comprises cracking said higher boiling hydrocarbons, separating the cracked product into a light fraction suitable for motor fuel, an intermediate distillate fraction, a heavy distillate fraction and a residuum, subjecting the intermediate distillate fraction to hydrocycliformation, separating the hydrocycliformation product into a light fraction suitable for motor fuel, an intermediate fraction and a heavy fraction, and passing the heavy distillate fraction of the cracked product and the heavy residual fraction of the hydrocycliformed product to the cracking zone.

2. Process according to claim 1 in which the cracking step is carried out at a temperature above 800° F. and under pressure in excess of 500 pounds per square inch, and the hydrocycliformation step is carried out at a temperature between about 900 and 1100° F. and under pressure in excess of 20 atmospheres.

3. Process according to claim 1 in which the light distillates suitable for motor fuel separated from the product of each zone are blended.

4. Improved process for preparing lower boiling hydrocarbons from higher boiling hydrocarbons, which comprises cracking the higher boiling hydrocarbons, separately removing from the cracked product a gasoline fraction and a heavy difficultly vaporizable tarry fraction, subjecting an intermediate distillate fraction of the cracked product boiling within the temperature range of 350 and 725° F. to hydrocycliformation, removing a gasoline fraction from the product of hydrocycliformation, separating from the remaining product of hydrocycliformation a fraction boiling between the limits of 350 and 550° F., returning this fraction to the hydrocycliformation step and passing the residue of the hydrocycliformation product to the cracking step.

5. Improved process for preparing lower boiling hydrocarbons suitable for motor fuel from higher boiling hydrocarbon oils, which comprises cracking said higher boiling hydrocarbon oils, separating the cracked product into a gasoline fraction, an intermediate fraction boiling within the approximate temperature range of 350 and 625° F., a heavy relatively higher boiling distillate fraction and a residuum, subjecting said intermediate fraction to hydrocycliformation, separating the products thereof into a gasoline fraction, an intermediate fraction of about the same boiling range as the intermediate fraction obtained from the product of cracking, and a heavy residue, returning the intermediate fraction of the hydrocycliformed product to the hydrocycliformation process and passing the heavy residue of the hydrocycliformed product to the cracking process.

PHILIP L. YOUNG.
DURAND CHURCHILL, Jr.